United States Patent
Nishikawa et al.

(10) Patent No.: US 9,324,326 B2
(45) Date of Patent: Apr. 26, 2016

(54) VOICE AGENT DEVICE AND METHOD FOR CONTROLLING THE SAME

(71) Applicant: Panasonic Corporation, Osaka (JP)

(72) Inventors: Yuri Nishikawa, Osaka (JP); Kazunori Yamada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 270 days.

(21) Appl. No.: 14/062,937

(22) Filed: Oct. 25, 2013

(65) Prior Publication Data

US 2014/0122077 A1 May 1, 2014

(30) Foreign Application Priority Data

Oct. 25, 2012 (JP) ................................ 2012-235902

(51) Int. Cl.
 *G10L 17/00* (2013.01)
 *G10L 17/04* (2013.01)

(52) U.S. Cl.
 CPC ................. *G10L 17/04* (2013.01); *G10L 17/00* (2013.01); *G10L 17/005* (2013.01)

(58) Field of Classification Search
 CPC ......... G10L 15/22; G10L 15/26; G10L 21/00; G10L 2021/02166; G10L 2015/225; G10L 25/00; G10L 25/87; G06Q 30/02; B60W 20/00; B60W 2550/402; B60W 50/14; B60W 2050/0089; B60W 2530/14; H04W 64/00; H04W 4/02; H04W 4/04; H04W 4/021; H04W 4/023
 USPC ................. 704/246, 235, 251, 255, 257, 270, 704/270.1, 272, 258, 3, 9, 249; 705/14.14; 702/159
 See application file for complete search history.

(56) References Cited

U.S. PATENT DOCUMENTS

| | | | | |
|---|---|---|---|---|
| 6,952,672 B2 * | 10/2005 | Smith | ................. | G10L 21/0272 379/387.01 |
| 2002/0077772 A1 * | 6/2002 | Squibbs | ................. | G10L 15/26 702/159 |
| 2008/0189173 A1 * | 8/2008 | Bakar | ................. | G06Q 30/02 705/14.14 |
| 2009/0210227 A1 * | 8/2009 | Sugiyama | ............... | G10L 15/22 704/246 |

FOREIGN PATENT DOCUMENTS

JP 2007-222968 9/2007

* cited by examiner

*Primary Examiner* — Huyen Vo

(74) *Attorney, Agent, or Firm* — Wenderoth, Lind & Ponack, L.L.P.

(57) ABSTRACT

A voice agent device includes: a position detection unit which detects a position of a person in a conversation space to which the voice agent device is capable of providing information; a voice volume detection unit which detects a voice volume of the person from a sound signal in the conversation space obtained by a sound acquisition unit; a conversation area determination unit which determines a conversation area as a first area including the position when the voice volume has a first voice volume value and determines the conversation area as a second area including the position and being smaller than the first area when the voice volume has a second voice volume value smaller than the first voice volume value, the conversation area being a spatial range where an utterance of the person can be heard; and an information provision unit which provides provision information to the conversation area.

10 Claims, 13 Drawing Sheets

FIG. 6

| Microphone | SN ratio | Distance d to conversation area |
|---|---|---|
| Microphone 102A | Large | Short |
| Microphone 102B | Large | Short |
| Microphone 102C | Small | Long |
| Microphone 102D | Intermediate | Middle |

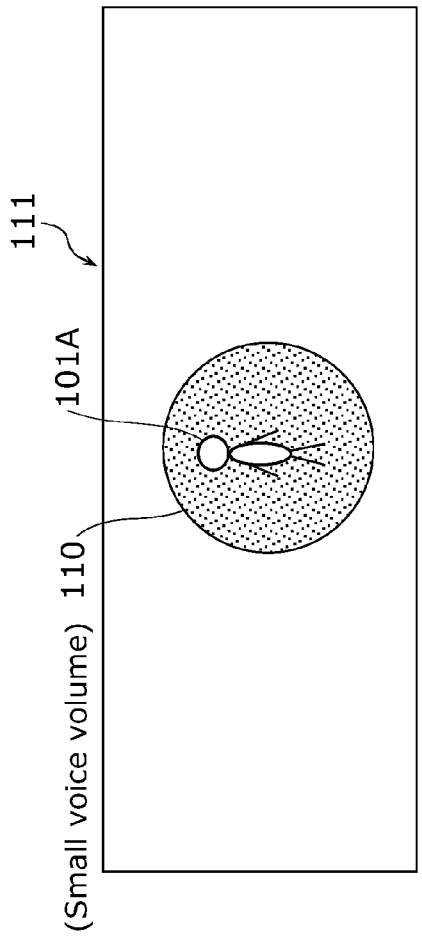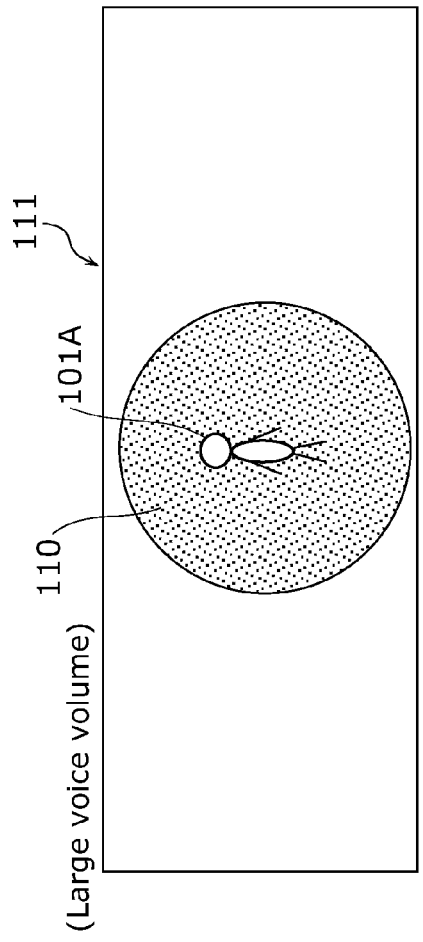

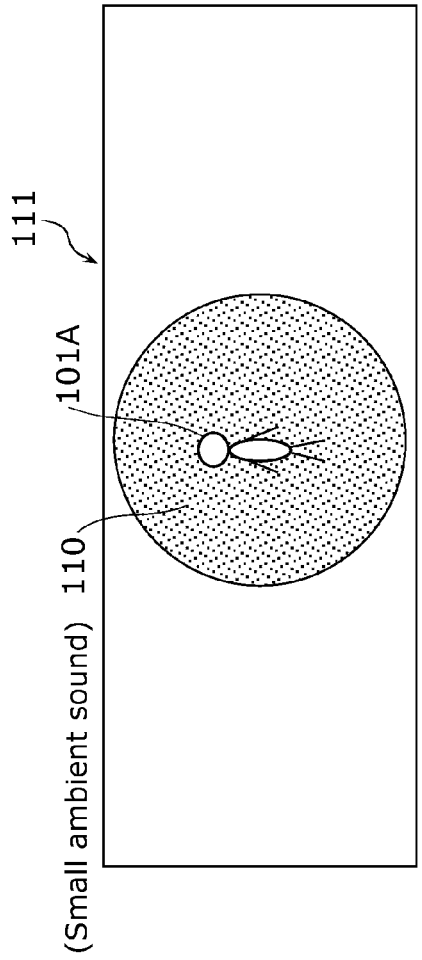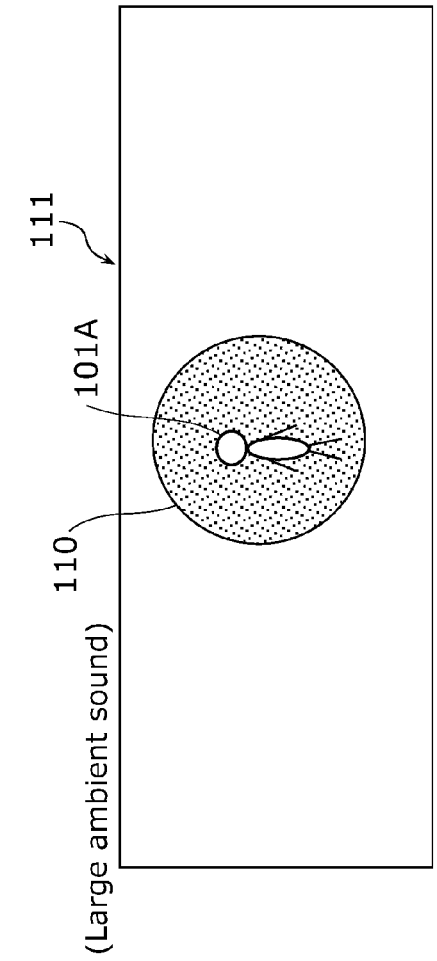

FIG. 10

| Information name | Value | Privacy setting information (Disclosure range) |
|---|---|---|
| Name | Taro Suzuki | All |
| Date of birth | August 1, 1983 | Family, friend |
| Gender | Male | All |
| ... | ... | ... |
| Information on stuff in refrigerator | Milk, fermented soybeans (natto), apple | Family |
| Recorded TV content 1 | (Video information) | All |
| Recorded TV content 2 | (Video information) | Family member aged 18 or older, Friend aged 18 or older |
| ... | ... | ... |

FIG. 11

| Name | Relationship |
|---|---|
| Jiro Suzuki | Family |
| Hanako Sato | Friend |
| Jiro Tanaka | Acquaintance |

220B

VOICE AGENT DEVICE AND METHOD FOR CONTROLLING THE SAME

CROSS REFERENCE TO RELATED APPLICATIONS

The present application is based on and claims priority of Japanese Patent Application No. 2012-235902 filed on Oct. 25, 2012. The entire disclosure of the above-identified application, including the specification, drawings and claims is incorporated herein by reference in its entirety.

FIELD

The present disclosure relates to a voice agent device.

BACKGROUND

Patent Literature 1 (PTL 1) discloses an example of the background art. The communication robot disclosed in PTL 1 has a conversation with a human using a sound. Moreover, the purpose of using the communication robot is to facilitate a conversation between people in a particular space and build a better human relationship.

When detecting two or more people whose distance is within a predetermined value, this communication robot determines that the people are in close proximity to each other, and approaches the people to identify individuals. This enables the communication robot to output by sound, information of common interest among the identified individuals, and to display a text, image, or video in a display.

CITATION LIST

Patent Literature

[PTL 1] Japanese Unexamined Patent Application Publication No. 2007-222968

SUMMARY

Technical Problem

However, it is important for a voice agent device such as the above communication robot to appropriately identify the space where people are having a conversation.

One non-limiting and exemplary embodiment provides a voice agent device capable of appropriately identifying the spatial range where people are having a conversation.

Solution to Problem

A voice agent device according to an aspect of the present disclosure includes: a position detection unit which detects a position of a person in a conversation space which is a space to which the voice agent device is capable of providing information; a voice volume detection unit which detects a voice volume of the person from a sound signal in the conversation space obtained by a sound acquisition unit; a conversation area determination unit which determines a conversation area as a first area including the position when the voice volume has a first voice volume value and determines the conversation area as a second area including the position and being smaller than the first area when the voice volume has a second voice volume value smaller than the first voice volume value, the conversation area being a spatial range where an utterance of the person can be heard; and an information provision unit which provides provision information to the conversation area.

It should be noted that general and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiment will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The present disclosure can provide a voice agent device capable of appropriately identifying the spatial range where people are having a conversation.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 6 illustrates relationships between the SN ratios of microphones and distances to a conversation area according to an embodiment.

FIG. 8A illustrates an example of a conversation area when a voice volume is small according to an embodiment.

FIG. 8B illustrates an example of a conversation area when a voice volume is large according to an embodiment.

FIG. 9A illustrates an example of a conversation area when an ambient sound is small according to an embodiment.

FIG. 9B illustrates an example of a conversation area when an ambient sound is large according to an embodiment.

FIG. 10 illustrates an example of individual profile information according to an embodiment.

FIG. 11 illustrates an example of human relationship information according to an embodiment.

Figure 1:
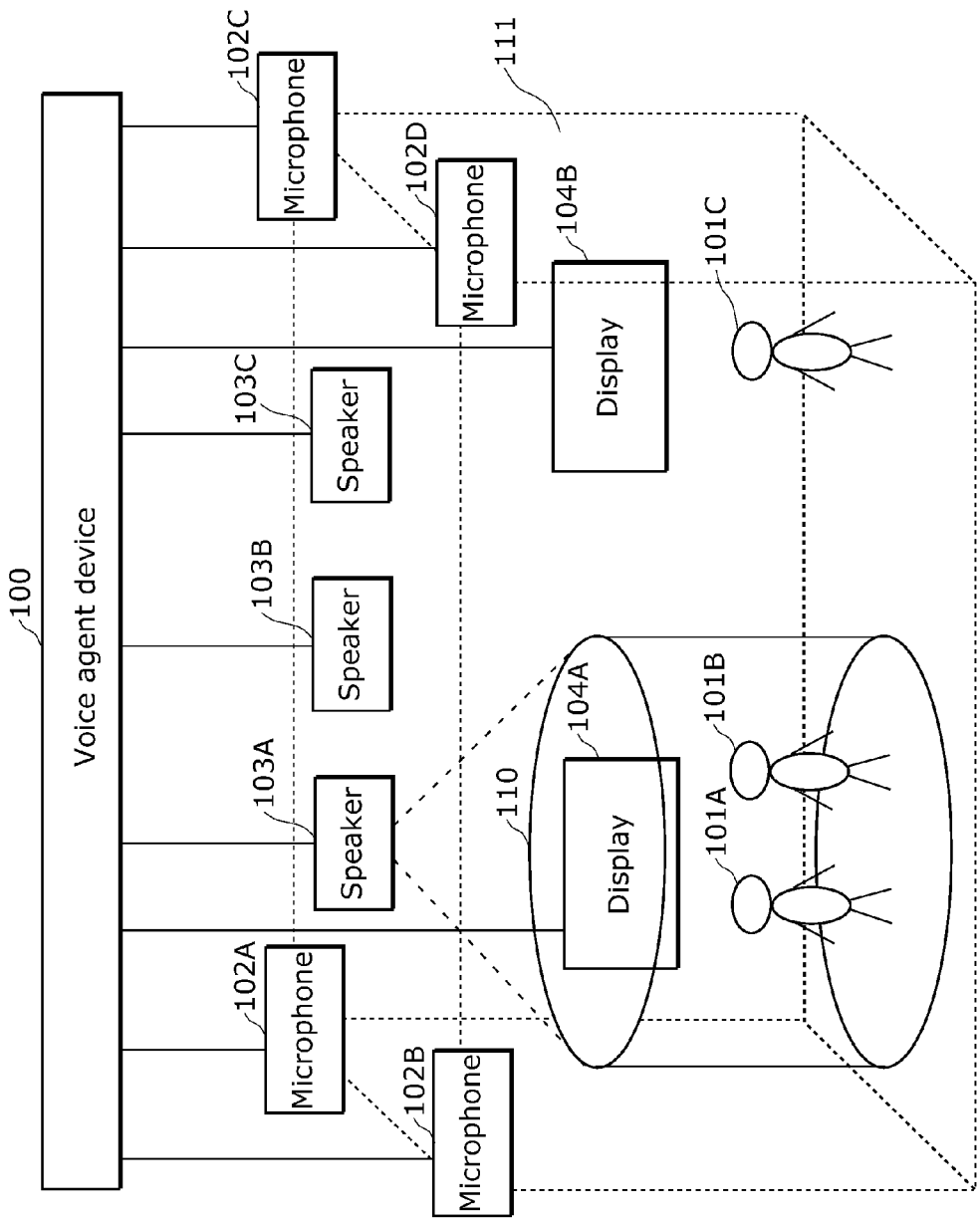
FIG. 1 illustrates a voice agent system according to an embodiment.

DESCRIPTION OF EMBODIMENT (Underlying Knowledge Forming Basis of the Present Disclosure)

The inventors of the present application have found that the following problem lies in the conventional technology.

When detecting two or more people in close proximity to each other, the communication robot disclosed in PTL 1 can approach and have a conversation with the people. However, the communication robot determines that the people are in close proximity to each other only when the distance(s) between the two or more people has a value not greater than a predetermined value. Therefore, the inventors of the present application have found that the following point is a problem. Although the two or more people understand that they are spending time together, and are having a conversation at voice volumes which they can clearly hear each other, if the distance(s) between the people has a value beyond or equal to a predetermined value, the communication robot determines that the two or more people are not having a conversation.

Moreover, the communication robot disclosed in PTL 1 can provide information of common interest among people. However, the communication robot does not know a relationship between the people, for example, whether they are family members, friends, or strangers. Therefore, the inventors of the present application have found that even if information is inappropriate depending on a relationship between people in close proximity to each other, the communication robot can not determine whether or not the information should be provided.

In addition, information provided by the sound of the communication robot disclosed in PTL 1 may be heard by other people to whom the information should not be provided. The inventors of the present application have found that a problem is, for example, in that when it is inappropriate to provide information to the people other than people to whom the information should be provided, the information provision cannot be prevented.

Specifically, for instance, the following assumes the situation: in a house, a father and a visitor are having a conversation, and a mother and their child are having a conversation at some distance from the father and the visitor. In this situation, it is not a problem if the voice agent device provides information including private information on the family during the conversation between the mother and the child. However, it is not preferable that this information be known by the visitor.

Moreover, for instance, the information which may be provided during the conversation between the father and the mother is different from the information which may be provided during the conversation between the father and the child.

To appropriately respond to the above situation, it is important to appropriately identify a spatial range (conversation area) where people are having a conversation in a conversation space (e.g., house), and control provision information using the conversation area.

A voice agent device according to an aspect of the present disclosure includes: a position detection unit which detects a position of a person in a conversation space which is a space to which the voice agent device is capable of providing information; a voice volume detection unit which detects a voice volume of the person from a sound signal in the conversation space obtained by a sound acquisition unit; a conversation area determination unit which determines a conversation area as a first area including the position when the voice volume has a first voice volume value and determines the conversation area as a second area including the position and being smaller than the first area when the voice volume has a second voice volume value smaller than the first voice volume value, the conversation area being a spatial range where an utterance of the person can be heard; and an information provision unit which provides provision information to the conversation area.

According to this configuration, the voice agent device can determine a conversation area where people are having a conversation in view of voice volumes. This enables the voice agent device to determine that people are having a conversation even if, for example, people at some distance from each other are having a conversation at large voice volumes.

For example, the voice agent device may further include an individual identification unit which identifies a person in the conversation area, in which the information provision unit includes: a memory unit which stores preset profile information showing pieces of information on individuals; and an information selection unit which, when people are in the conversation area, selects the provision information to be provided to the people, based on the profile information and identification results obtained by the individual identification unit.

According to this configuration, the voice agent device can provide information appropriate for people having a conversation.

Moreover, the profile information may show preset pieces of information which can be provided to the individuals, and when people are in the conversation area, the information selection unit may determine, based on the profile information, common information which can be provided to all of the people, and select the provision information from the common information.

According to this configuration, the voice agent device can provide appropriate information in view of, for example, the individual profiles, privacy, and a human relationship of all the people in the conversation area.

For example, the individual identification unit may identify the person in the conversation area by recognizing a pre-registered voiceprint of the person from the sound signal.

According to this configuration, the voice agent device can identify a person in the conversation area from a sound. This can achieve the above function without introducing a new device for identifying individuals. Thus, cost reduction for the voice agent device can be achieved.

For example, the voice agent device may further include an ambient sound measurement unit which measures an ambient sound in the conversation space, in which the conversation area determination unit may determine the conversation area as a third area when the ambient sound has a first sound volume and determine the conversation area as a fourth area smaller than the third area when the ambient sound has a second sound volume larger than the first sound volume.

According to this configuration, the voice agent device can more appropriately determine a conversation area since the conversation area can be determined in view of an ambient sound.

For example, the information provision unit may include an output selection unit which selects an output device placed nearest the conversation area from among a plurality of output devices placed in the conversation space, and provides the provision information to the conversation area by outputting the provision information to the selected output device.

According to this configuration, the voice agent device can provide information only to particular people to whom the information may be provided among people in the conversation space.

For example, the output selection unit may output sound information of a third sound volume as the provision information when the conversation area is a fifth area, and may output sound information of a fourth sound volume larger than the third sound volume as the provision information when the conversation area is a sixth area larger than the fifth area.

According to this configuration, the voice agent device can provide information only to particular people to whom the information may be provided among people in the conversation space.

For example, the information provision unit may include an output selection unit which provides the provision information to the conversation area in the conversation space via an output device capable of providing information only to part of the conversation space.

According to this configuration, the voice agent device can provide information only to particular people to whom the information may be provided among people in the conversation space.

Moreover, a method of controlling a voice agent device according to an aspect of the present disclosure includes: detecting a position of a person in a conversation space which is a space to which the voice agent device is capable of providing information; detecting a voice volume of the person from a sound signal in the conversation space obtained by a sound acquisition unit; determining, when the voice volume has a first voice volume value, a conversation area as a first area including the position, and determining, when the voice volume has a second voice volume value smaller than the first voice volume value, the conversation area as a second area including the position and being smaller than the first area, the conversation area being a spatial range where an utterance of the person can be heard; and providing provision information to the conversation area.

According to this, the area where people are having a conversation can be determined in view of voice volumes by the method of controlling.

It should be noted that general and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

The following details an embodiment with reference to drawings.

It should be noted that each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment

The following describes a method for a voice agent device selecting a topic of conversation based on the understanding of an environment in which people are placed, in particular when two or more people are in the same space, and a device for achieving the method.

The following describes in order the configuration of a voice agent system, the configuration of the voice agent device, the procedure of processing performed by the voice agent device, the procedure of determining a conversation area, a specific example of profile information, and the procedure of selecting a topic of conversation.

The following describes the configuration of the voice agent system including the voice agent device according to the present embodiment. FIG. 1 is a block diagram illustrating the voice agent system according to the present embodiment.

The voice agent system shown in FIG. 1 includes a voice agent device 100, microphones 102A to 102D, speakers 103A to 103C, and displays 104A and 104B. It should be noted that when the microphones 102A to 102D are not distinguished from each other, they are also referred to as microphones 102. Moreover, when the speakers 103A to 103C are not distinguished from each other, they are also referred to as speakers 103. When the displays 104A and 104B are not distinguished from each other, they are also referred to as displays 104. Moreover, the respective number of the microphones 102, the speakers 103, and the displays 104 is not limited to the respective number stated above, but may be a given number.

Here, the microphone 102 is just an example of a sound acquisition unit for acquiring sound in a conversation space 111. Moreover, the speaker 103 is placed in the conversation space 111, and is an example of a sound output unit for outputting a sound to the conversation space 111. The display 104 is placed in the conversation space 111, and is an example of a display unit for displaying a text, image, and video.

The voice agent device 100 (also referred to as a conversation agent device or voice conversation agent device) has a conversation with people in the conversation space 111. In other words, the conversation space 111 is a space to which the voice agent device 100 can provide information (space where a conversation between the voice agent device 100 and people is possible).

The voice agent device 100 recognizes the voice of a user, and displays information in the speaker 103 or the display 104 according to an instruction by voice input from the user. More specifically, the voice agent device 100 displays content according to the instruction by the voice input from the user, and answers a question from the user. It should be noted that when the user is not trying to have a conversation with the voice agent device 100, if a predetermined condition is satisfied, the voice agent device 100 may voluntarily ask the user a question.

Moreover, here, the voice agent device 100 is connected to the speakers 103 and the displays 104. However, the voice agent device 100 may be connected to either speakers 103 or the displays 104. Moreover, wired or wireless connection is possible for the connection between the voice agent device 100 and the speakers 103 and the connection between the voice agent device 100 and the displays 104. Moreover, at least some of the microphones 102, the speakers 103, and the displays 104 may be integrated.

This voice agent system is placed in a room in a building such as a house or office. In an example shown in FIG. 1, there are three people 101A to 101C in the conversation space 111. The person 101A and the person 101B of the three people 101A to 101C are in close proximity to each other, and are having a conversation. Moreover, the person 101C is distant from the person 101A and the person 101B. Moreover, the person 101A is a speaker.

The voice agent device 100 determines, according to sound signals obtained from the microphones 102, a conversation area 110 which is a spatial range where the utterance of the person 101A can be heard. The voice agent device 100 identifies that people in the conversation area 110 are the person 101A and the person 101B. The voice agent device 100 provides information by controlling the sound volume and others of the speaker 103 so that the person 101A and 101B can hear.

Figure 2:
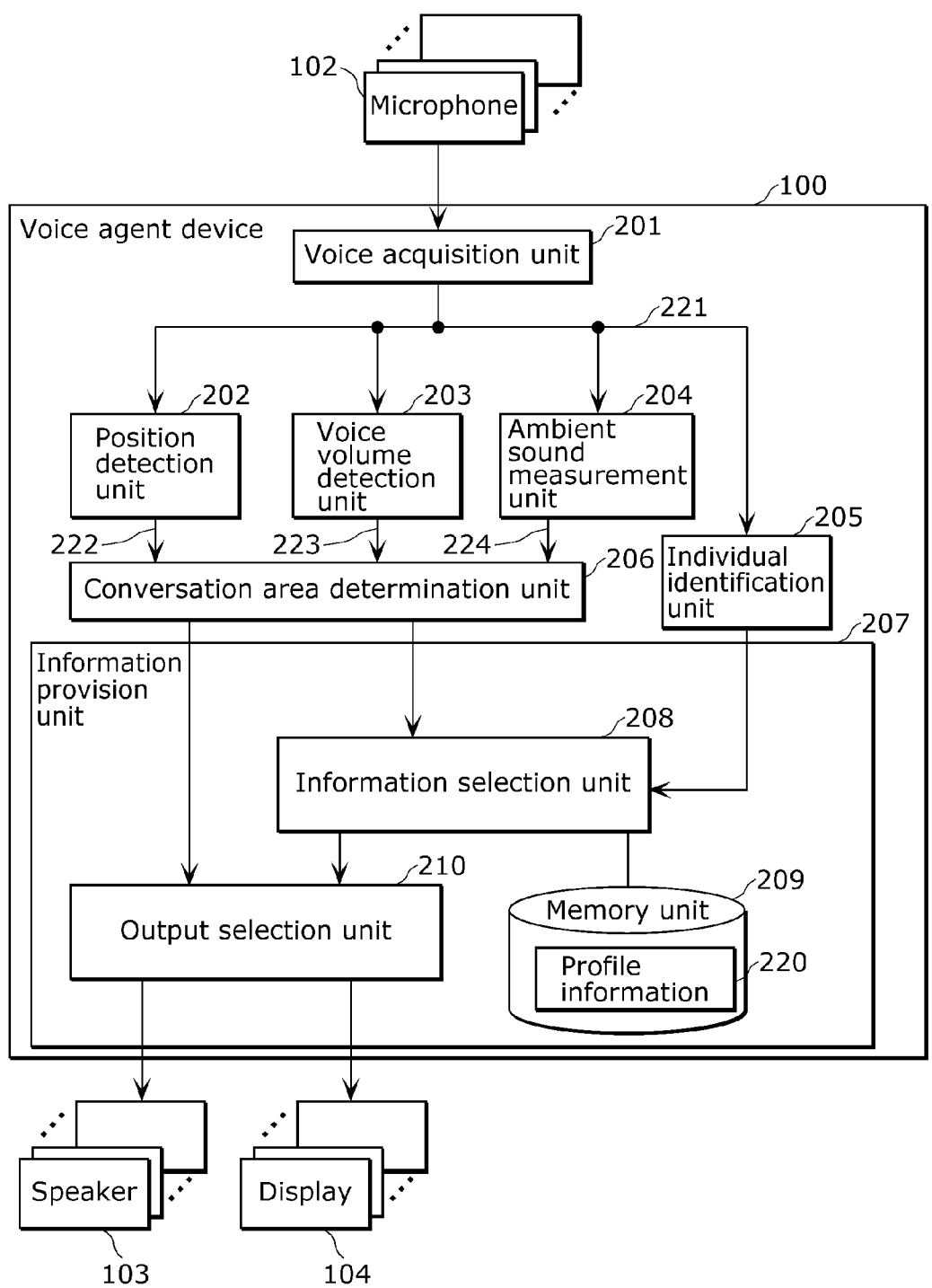
FIG. 2 is a block diagram illustrating a voice agent device according to an embodiment.

The following describes the configuration of the voice agent device 100. FIG. 2 is a block diagram showing a system configuration of the voice agent device 100.

As shown in FIG. 2, the voice agent device 100 includes a sound acquisition unit 201, a position detection unit 202, a voice volume detection unit 203, an ambient sound measurement unit 204, an individual identification unit 205, a conversation area determination unit 206, and an information provision unit 207.

The sound acquisition unit 201 acquires sound signals 221 obtained by the microphones 102.

The position detection unit 202 detects the position coordinates of a person (position 222) in the conversation space 111. Specifically, the position detection unit 202 detects the position 222 based on the voice (voice volume) of the person included in the sound signals 221. It should be noted that the position detection unit 202 may detect the position 222 based on information obtained by a camera or a sensor. It should be noted that the use of sound is more preferable since other device (such as a camera) is unnecessary for the position detection. Moreover, when the sound is not used for the position detection, the voice agent device 100 may obtain the sound signal 221 from the same microphone 102.

The voice volume detection unit 203 detects a voice volume 223 of a person from the sound signal 221.

The ambient sound measurement unit 204 measures from the sound signal 221, an ambient sound 224 indicating the noise level of the conversation space 111.

The individual identification unit 205 identifies a person in the conversation space 111 (the conversation area 110). For instance, the individual identification unit 205 identifies the person in the conversation space 111 by recognizing the pre-registered voiceprint of the person with the sound signal 221. Specifically, the individual identification unit 205 retains information on the pre-registered voiceprint of the person. Moreover, the individual identification unit 205 identifies the person by comparing the information on this voiceprint and the voice volume of the person included in the sound signal 221. It should be noted that the individual identification unit 205 may identify the person by other means such as image authentication or skeleton authentication. It should be noted that the use of voice (voiceprint) is more preferable since other device (such as a camera) is unnecessary for the position detection.

The conversation area determination unit 206 determines the conversation area 110 which is a spatial range where the utterance of the person 101A in the conversation space 111 can be heard. Specifically, the conversation area determination unit 206 determines the conversation area 110 which includes the position 222 and has a space size according to the voice volume 223 and the ambient sound 224.

The information provision unit 207 provides provision information to the conversation area 110. Here, the provision information is at least one of sound information, text information, an image, and a video. Specifically, the information provision unit 207 provides the provision information to the speaker 103 or the display 104 according to an instruction by voice input from the user. Moreover, the information provision unit 207 may provide, as the provision information, information stored by the voice agent device 100 or information obtained from other device.

The information provision unit 207 includes an information selection unit 208, a memory unit 209, and an output selection unit 210.

The memory unit 209 stores profile information 220 including pieces of information on individuals.

The information selection unit 208 selects information to be provided to the conversation area 110. For instance, when there are two or more people in the conversation area 110, the information selection unit 208 selects provision information to be provided to the people based on the profile information 220 and identification results obtained by the individual identification unit 205.

The output selection unit 210 selects an output device appropriate for the conversation area 110 from among output devices (the speakers 103 and the displays 104) placed in the conversation space 111, and output the provision information to the selected output device. Here, the output device appropriate for the conversation area 110 is, for example, an output device placed at the nearest position from the conversation area 110.

Figure 3:
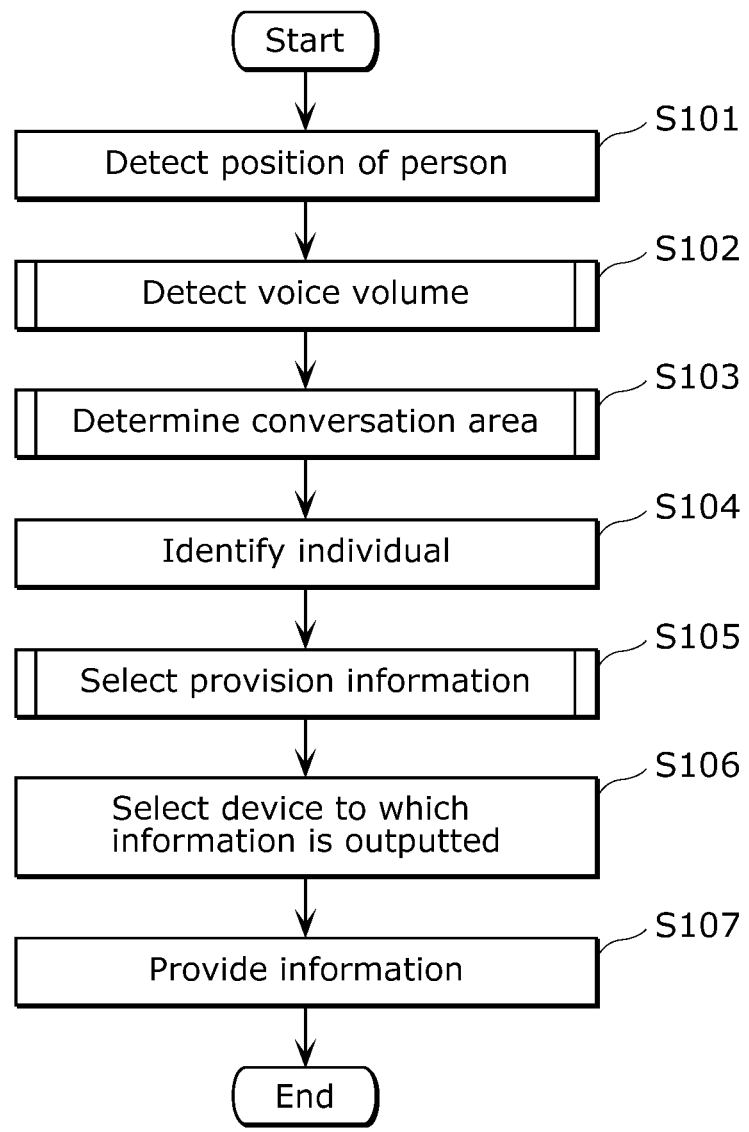
FIG. 3 is a flowchart illustrating processing performed by a voice agent device according to an embodiment.

The following describes the operation of the voice agent device 100. FIG. 3 is a flowchart illustrating the procedure of detecting people and changing a topic of conversation by the voice agent device 100.

The position detection unit 202 detects the positions 222 of the people 101A to 101C in a room (conversation space 111) (S101). The voice volume detection unit 203 detects the voice volumes 223 of the people 101A to 101C (S102). The conversation area determination unit 206 determines the conversation area 110 using the positions 222 and the voice volumes 223 (S103). The individual identification unit 205 identifies individuals, i.e., each of the people 101A to 101C in the conversation space 111 (S104). It should be noted that the step S101 to S104 may be performed in an arbitrary order, and some of these steps may be performed concurrently.

Moreover, some or all of these steps S101 to S104 may be constantly performed (may be repeated at predetermined time intervals), or may be performed when a predetermined condition is satisfied, for example, immediately before the voice agent device 100 provides information. Moreover, the processing of the steps S102 to S104 may be performed for all of the people or some of the people in the conversation space 111. For instance, the voice volume detection processing (S102) may be performed only for a speaker. Moreover, the individual identification processing (S104) may be performed only for the people in the conversation area 110 including the speaker.

Figure 4:
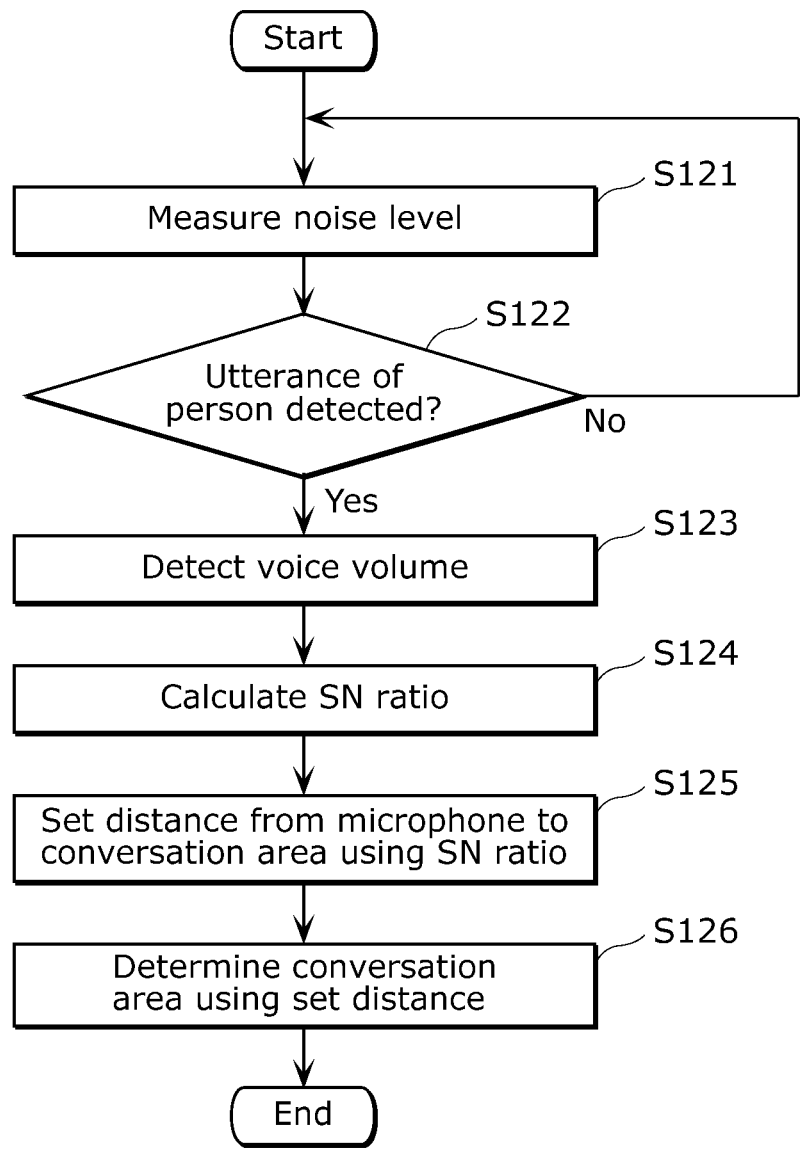
FIG. 4 is a flowchart illustrating the processing of determining a conversation area performed by a voice agent device according to an embodiment.

FIG. 4 is a flowchart illustrating a specific example of the processing of detecting a voice volume and determining a conversation area shown in FIG. 3 (S103 and S104).

The ambient sound measurement unit 204 constantly measures the noise level (the ambient sound 224) of the conversation space 111 where there are two or more people, from the sound signals 221 obtained by the microphones 102 placed in the conversation space 111 (S121). Moreover, the voice volume detection unit 203 detects the utterance of a person in the conversation space 111 from the sound signals 221 (S122). When the utterance of the person is detected (Yes in S122), the voice volume detection unit 203 detects the voice volume 223 of the speaker by detecting the input level of the utterance from the sound signals 221 (S123).

The conversation area determination unit 206 calculates a signal-to-noise ratio (SN ratio) using the ambient sound 224 and the voice volume 223 detected in the steps S121 and S123 (S124). Here, the SN ratio is a value obtained by dividing the voice volume 223 by the ambient sound 224. It should be noted that the SN ratio is not limited to this, and it may have any value as long as the SN ratio increases with an increase in the voice volume 223 and decreases with an increase in the ambient sound 224.

The conversation area determination unit 206 sets distances d between the conversation area 110 and the microphones 102 using the SN ratio (S125). The conversation area determination unit 206 determines the conversation area 110 using the set distances (S126).

Figure 5:
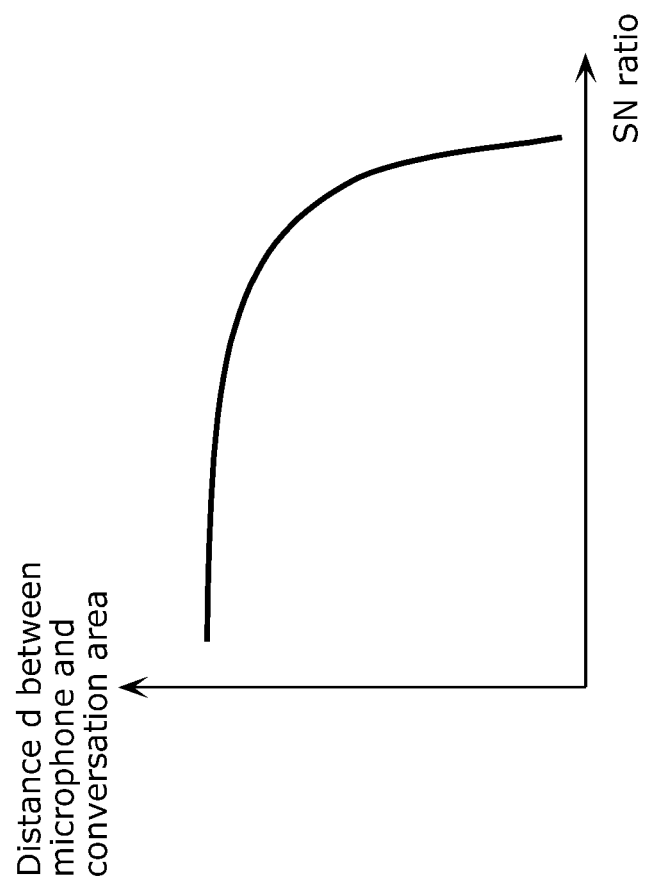
FIG. 5 is a graph showing a relationship between a SN ratio and the distance between a microphone and a conversation area according to an embodiment.

FIG. 5 is a graph showing the relationship between the SN ratio and the distance d from the microphone 102 to the conversation area 110. If the SN ratio is known, it is possible to calculate the distance d between a microphone and the conversation area based on the relationship shown in FIG. 5. It should be noted that the relationship between the SN ratio and the distance d shown in FIG. 5 is just an example, and other relationships are also possible as long as the larger the SN ratio is, the shorter the distance d is.

Figure 7:
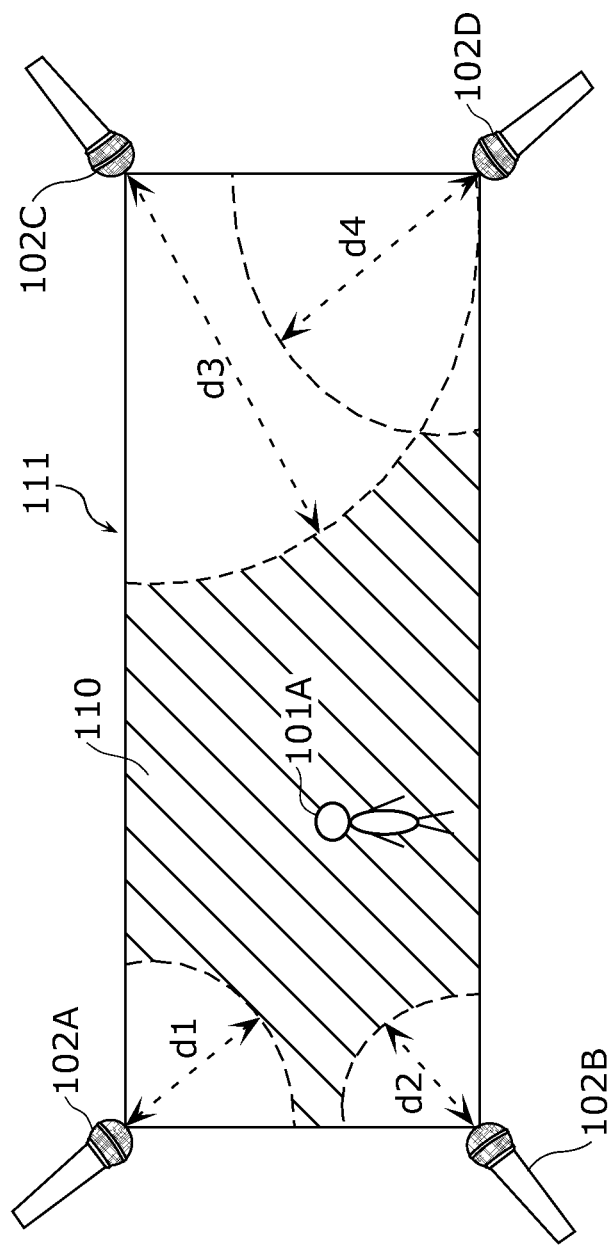
FIG. 7 is a conceptual diagram showing a method for determining a conversation area according to an embodiment.

FIG. 6 illustrates the relationships between the SN ratios of the microphones 102A to 102D and the distances d to the conversation area in the example shown in FIG. 7.

FIG. 7 is a conceptual diagram showing a method for determining the conversation area 110. As shown in FIG. 7, the conversation area determination unit 206 calculates from the SN ratios, distances d1 to d4 between the conversation area 110 and the microphones 102A to 102D. The conversation area determination unit 206 draws circles so that each microphone 102 is the center of a circle and the distance d is the radius. The conversation area determination unit 206 determines as the conversation area 110, a space except the areas occupied by the drawn circles in the conversation space 111.

It should be noted that the above described as an example that the ambient sound 224 is constantly measured. However, the ambient sound may be measured when a predetermined condition is satisfied, for example, when an utterance is detected. In this case, the ambient sound measurement unit 204 may extract the ambient sound 224 from the sound signals 221 through filter processing or the like.

Moreover, the method for determining the conversation area 110 is not limited to the above method, and other methods may be employed. For example, the conversation area 110 may be a circle having the position 222 as its center. The radius of the circle increases with an increase in the voice volume 223, and decreases with an increase in the ambient sound 224. That is, as shown in FIGS. 8A and 8B, when the voice volume 223 has a first voice volume value, the conversation area determination unit 206 determines the conversation area 110 as a first area. When the voice volume 223 has a second voice volume value smaller than the first voice volume value, the conversation area determination unit 206 determines the conversation area 110 as a second area smaller than the first area. Moreover, as shown in FIGS. 9A and 9B, when the ambient sound 224 has a first sound volume, the conversation area determination unit 206 determines the conversation area 110 as a third area. When the ambient sound 224 has a second sound volume larger than the first volume, the conversation area determination unit 206 determines the conversation area 110 as a fourth area smaller than the third area.

It should be noted that the conversation area 110 does not have to be a circle, and may be in an arbitrary shape. Moreover, the conversation area 110 does not have to be an area having the position 222 as its center or centroid, and may be an area including the position 222. Moreover, the processing in view of the ambient sound 224 was described above. However, the conversation area determination unit 206 may determine the conversation area 110 only based on the voice volume 223 without taking into account the ambient sound 224.

It should be noted that when the voice volume 223 and the ambient sound 224 are taken into account and the sound signals 221 from the microphones 102 are used, the conversation area 110 can be appropriately determined by simple processing using the SN ratios as described above. Specifically, only by a series of the steps described above, it is possible to calculate the conversation area 110 in view of the position and voice volume of a speaker and an ambient sound.

The following description is again based on FIG. 3.

After the determination of the conversation area 110 (S103) and the individual identification processing (S104), the information selection unit 208 selects provision information to be provided to the conversation area 110 (S105). Specifically, the information selection unit 208 selects the provision information based on the profile information 220 including pieces of information on individuals and stored in the memory unit 209. Moreover, when there are two or more people in the conversation area 110, the information selection unit 208 selects the provision information to be provided to the people, based on the profile information 220 and identification results obtained by the individual identification unit 205.

Here, the profile information 220 includes individual profile information 220A and human relationship information 220B.

FIG. 10 illustrates a specific example of the individual profile information 220A. The individual profile information 220A includes privacy setting information 220C which indicates the disclosure range of the information set for each piece of information. The individual profile information 220A is provided for each person. It should be noted that part of the individual profile information 220A may be managed as common information among individuals.

FIG. 11 is a specific example of the human relationship information 220B. The human relationship information 220B shows the relationship (e.g., family) between a person (e.g., Taro Suzuki) and another person (e.g., Jiro Suzuki).

The information selection unit 208 can determine information which can be provided to each person by using the privacy setting information 220C and the human relationship information 220B. That is, the profile information 220 includes preset pieces of information which can be provided to the individuals. Moreover, when there are two or more people in the conversation area 110, the information selection unit 208 determines common information which can be provided to all of the people, based on the profile information 220, and selects provision information from the common information.

The following describes, as a specific example of the provision information selection processing shown in FIG. 3 (S105), the operation of the voice agent device 100 when a speaker (e.g., the person 101A) instructs the voice agent device 100 to display content.

Figure 12:
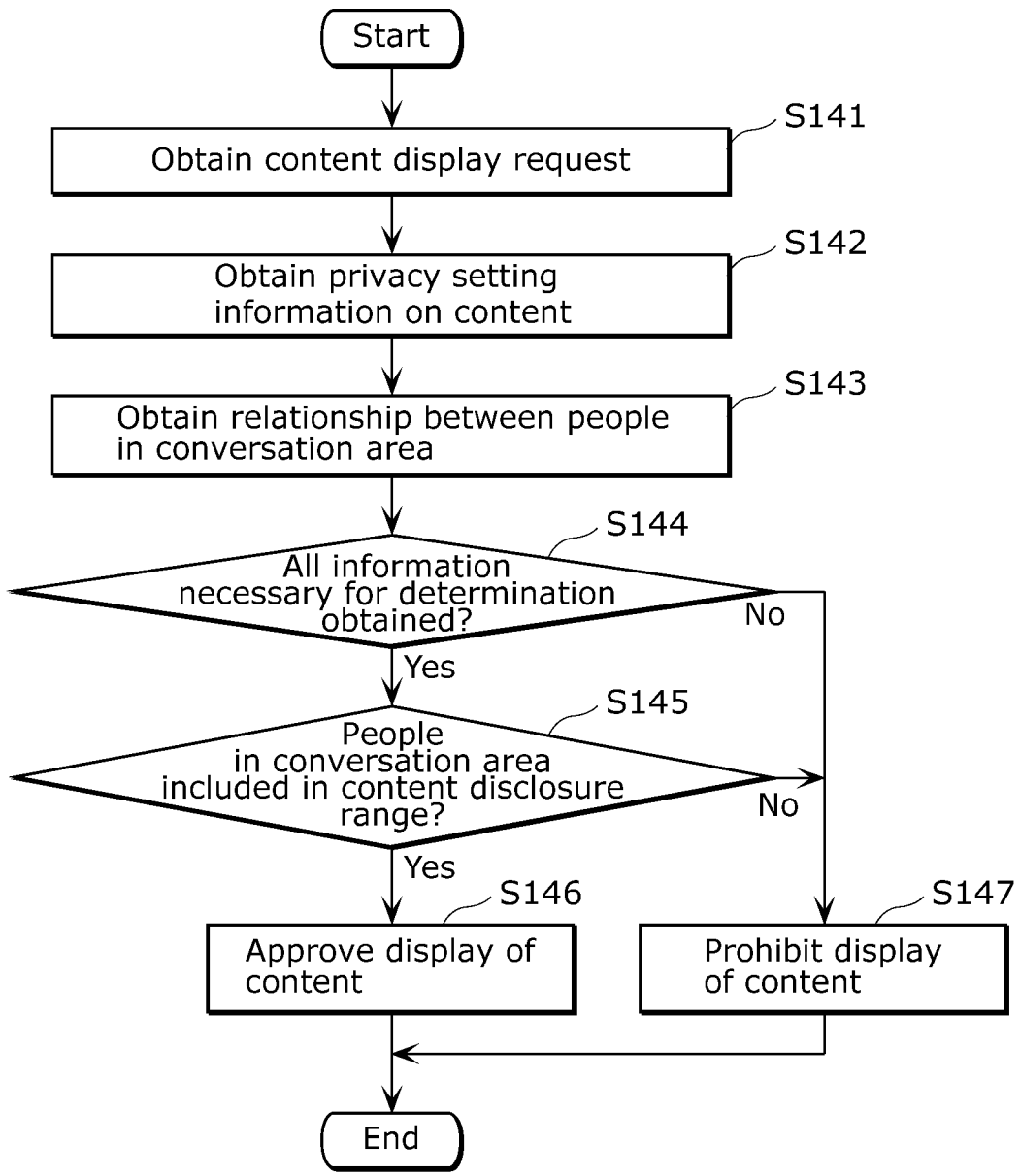
FIG. 12 is a flowchart illustrating the processing of selecting a topic of conversation performed by a voice agent device according to an embodiment.

FIG. 12 is a flowchart illustrating the procedure of selecting a topic of conversation.

The information provision unit 207 obtains a content display request from a result of analyzing the sound signals 221 (S141). The information selection unit 208 obtains based on individual identification results, the privacy setting information 220C of target content included in the individual profile information 220A of each person (e.g., the persons 101A and 101B) in the conversation area 110 (S142). Moreover, the information selection unit 208 obtains the relationship between the people in the conversation area 110 based on the human relationship information 220B (S143).

When necessary information is obtained in the steps S142 and S143 (Yes in S144), the information selection unit 208 determines, using the disclosure range shown in the privacy setting information 220C of the content (hereinafter referred to as "content disclosure range") and the relationship(s) between the people in the conversation area 110, whether all of the people in the conversation area 110 are included in the content disclosure range (S145). When all the people in the conversation area 110 are included in the content disclosure range (Yes in S145), the information selection unit 208 approves the display of content (S146), and the output selection unit 210 displays the content. Meanwhile, when at least one of the people in the conversation area 110 is not included in the content disclosure range (No in S145), the information selection unit 208 prohibits the display of the content (S147).

Moreover, in the step S144, when the obtainment of all the information necessary for determination is failed (No in S144), the information selection unit 208 prohibits the display of the content (S147). Here, as an example of the case where the obtainment of all the information necessary for determination is failed, the following case can be assumed. The information on at least one person among the people in the conversation area 110 is not registered in the voice agent device 100, and the relationship(s) between the person and the other person (people) is not included in the human relationship information 220B.

Moreover, the above described as an example that the content is displayed according to user's instruction. However, similar processing can be performed also when the voice agent device 100 voluntarily displays information. In this case, the information selection unit 208 selects provision information from the information which may be provided to all the people in the conversation area 110.

The following description is again based on FIG. 3.

After the selection of the provision information (S105), the output selection unit 210 selects an output device (speaker or display) to which information is to be outputted (S106). Specifically, the output selection unit 210 selects the output device to which the information is to be outputted so that the provision information is provided only to the conversation area 110 of the conversation space 111. For instance, the output selection unit 210 selects the output device placed at the nearest position to the conversation area 110.

Moreover, the output selection unit 210 changes, according to the size of the conversation area 110, the sound volume of sound information outputted by the speaker 103. Specifically, the output selection unit 210 increases the sound volume of the sound information with an increase in the size of the conversation area 110. That is, when the conversation area 110 is a fifth area, the output selection unit 210 outputs the sound information of a third sound volume as provision information. When the conversation area 110 is a sixth area larger than the fifth area, the output selection unit 210 outputs the sound information of a fourth sound volume larger than the third sound volume.

In other words, the output selection unit 210 changes the sound volume of sound information outputted by the speaker 103, according to the voice volume 223 of a conversation between/among the people in the conversation area 110. Specifically, the output selection unit 210 increases the sound volume with an increase in the voice volume 223. Moreover, the output selection unit 210 changes, according to the ambient sound 224, the sound volume of sound information outputted by the speaker 103. Specifically, the output selection unit 210 decreases the sound volume with an increase in the ambient sound 224. Moreover, the output selection unit 210 may change the sound volume according to information included in the individual profile information 220B of each person in the conversation area 110 (such as age).

It should be noted that the output selection unit 210 may change sound quality (such as frequency) according to at least one of the size of the conversation area 110, the voice volume 223 of a conversation between/among people in the conversation area 110, the ambient sound 224, and the individual profile information 220B.

The output selection unit 210 causes the selected output device to display provision information (S107).

It should be noted that the order of the selection of the provision information (S105) and the selection of a device to which the information is to be outputted (S106) may be reversed, and part of the steps may be performed concurrently.

Moreover, the above described as an example that the voice agent device 100 is connected to more than one output device. However, the voice agent device 100 may be connected to only one output device capable of providing information only to part of the conversation space 111. Here, a directional speaker or the like is an example of the output device capable of providing the information only to the part of the conversation space 111. In this case, the output selection unit 210 provides provision information only to the conversation area 110 of the conversation space 111 via the output device.

Figure 13:
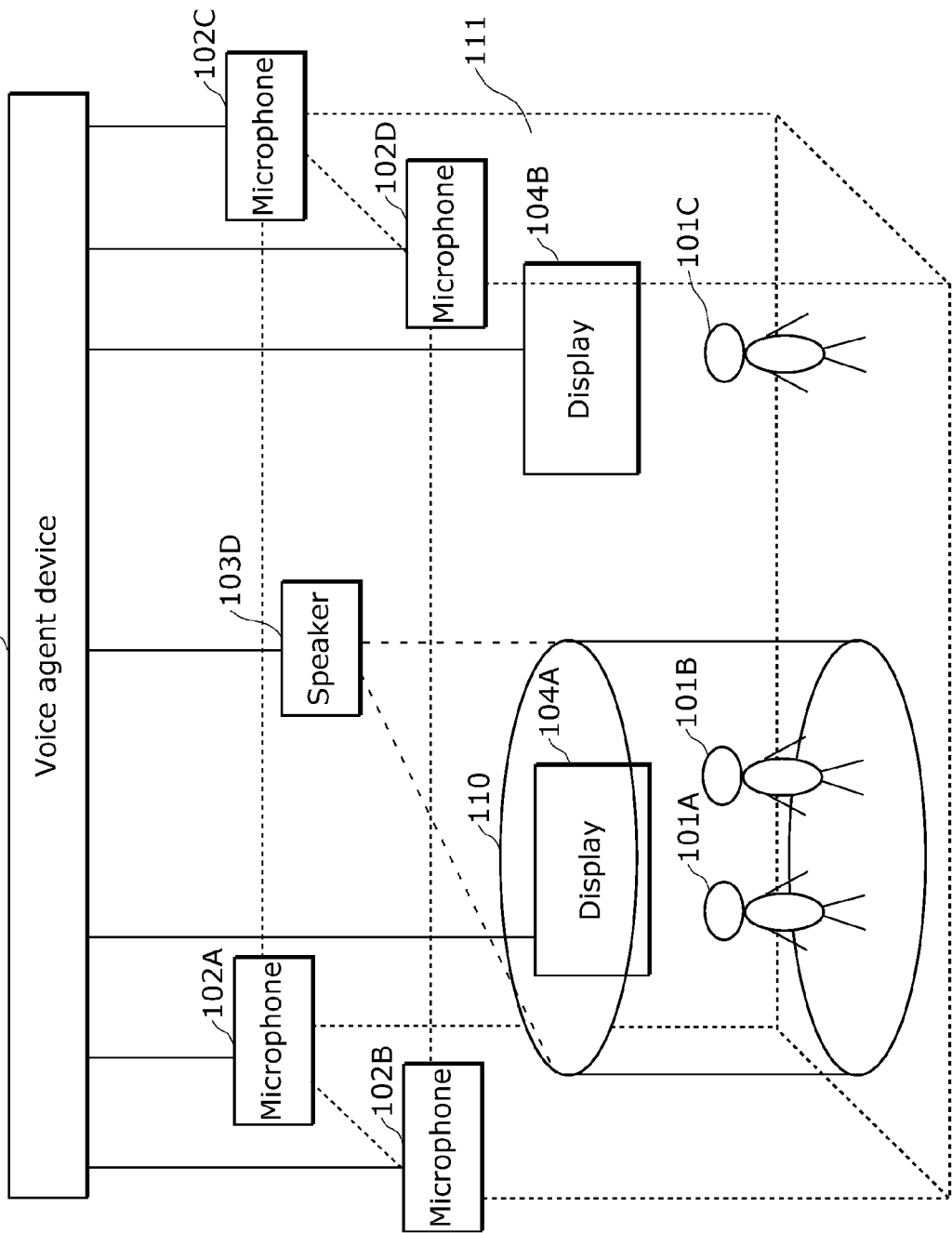
FIG. 13 illustrates a voice agent system according to a modification of an embodiment.

FIG. 13 is a block diagram of a voice agent system in this case. As shown in FIG. 13, the voice agent device 100 is connected to a speaker 103D such as the directional speaker or the like. The output selection unit 210 in the voice agent device 100 controls the speaker 103D so that sound information is outputted only to the conversation area 110.

Thus, the voice agent device 100, for example, continuously measures the ambient sound 224 and continuously detects the positions 222 of people in a room. When the voice volume detection unit 203 detects the utterance of a person in the room, the conversation area determination unit 206 detects the position and the voice volume of the speaker, and determines the conversation area 110 which is a spatial range where the utterance of the speaker can be heard, based on the ratio of the signal level of an ambient sound and the voice volume of the speaker. The individual identification unit 205 identifies individuals by recognizing the voiceprints of the people in the conversation area 110. The information selection unit 208 can obtain relationship(s) between the identified individuals, and select a topic of conversation based on the relationship(s). That is, the voice agent device 100 can facilitate the conversation in a room where there are two or more people, without providing inappropriate information depending on a relationship between people.

Thus, the voice agent devices according to the embodiment were described. However, the present disclosure is not limited to the present embodiment.

Moreover, each processing unit in the voice agent devices according to the embodiment is typically realized as a large-scale integration (LSI) which is an integrated circuit. These may be integrated into individual one chip or integrated into one chip so as to include a part or all of these.

Moreover, circuit integration is not limited to the LSI, and a special circuit or a general purpose processor may also achieve the circuit integration. A field programmable gate array (FPGA) that can be programmed after manufacturing the LSI or a reconfigurable processor that allows the connection or setting of a circuit cell in the LSI to be reconfigured.

It should be noted that each structural element in the above-described embodiment may be formed of a dedicated hardware product, or may be realized by executing a software program suitable for the each structural element. The each structural element may be realized by a program executing unit such as a CPU or a processor reading and executing the software program recorded on a recording medium such as a hard disk drive or a semiconductor memory.

Furthermore, the present disclosure may be the above program or a non-transitory computer-readable recording medium having the program stored thereon. Moreover, the above program can be, of course, distributed via a transmission medium such as the Internet.

Moreover, all the numbers used above are exemplified to detail the present disclosure, and the present disclosure is not limited to the exemplified numbers. Moreover, the connections between the structural elements are exemplified to detail the present disclosure, and the connections for achieving the function of the present disclosure are not limited to this.

Moreover, the division of the functional blocks in the block diagrams is just an example. Multiple functional blocks may be achieved as one functional block, one functional block may be divided into multiple blocks, or part of a function may be transferred to another functional block. Moreover, the parallel or time-division processing of the functions of multiple functional blocks having similar functions may be performed by the same hardware or software.

Although only some exemplary embodiments have been described above, the scope of the Claims of the present application is not limited to these embodiments. Those skilled in the art will readily appreciate that various modifications may be made in these exemplary embodiments and that other embodiments may be obtained by arbitrarily combining the structural elements of the embodiments without materially departing from the novel teachings and advantages of the subject matter recited in the appended Claims. Accordingly, all such modifications and other embodiments are included in the present disclosure.

INDUSTRIAL APPLICABILITY

The present disclosure is applicable to a voice agent device.

The invention claimed is:

1. A voice agent device comprising:
a position detection unit configured to detect a position of a person in a conversation space which is a space to which the voice agent device is capable of providing information;
a voice volume detection unit configured to detect a voice volume of the person from a sound signal in the conversation space obtained by a sound acquisition unit;
a conversation area determination unit configured to:
when the voice volume has a first voice volume value, determine a conversation area as a first area including the position; and
when the voice volume has a second voice volume value smaller than the first voice volume value, determine the conversation area as a second area including the position and being smaller than the first area,
the conversation area being a spatial range where an utterance of the person can be heard;
an information provision unit configured to provide provision information to the conversation area; and
an individual identification unit configured to identify a person in the conversation area,
wherein the information provision unit includes:
a memory unit configured to store preset profile information showing pieces of information on individuals; and
an information selection unit configured to, when people are in the conversation area, select the provision information to be provided to the people, based on the profile information and identification results obtained by the individual identification unit.

2. The voice agent device according to claim 1,
wherein the profile information shows preset pieces of information which can be provided to the individuals, and
when people are in the conversation area, the information selection unit is configured to determine, based on the profile information, common information which can be provided to all of the people, and select the provision information from the common information.

3. The voice agent device according to claim 1,
wherein the individual identification unit is configured to identify the person in the conversation area by recognizing a pre-registered voiceprint of the person from the sound signal.

4. A voice agent device comprising:
a position detection unit configured to detect a position of a person in a conversation space which is a space to which the voice agent device is capable of providing information;
a voice volume detection unit configured to detect a voice volume of the person from a sound signal in the conversation space obtained by a sound acquisition unit;
a conversation area determination unit configured to:
when the voice volume has a first voice volume value, determine a conversation area as a first area including the position; and
when the voice volume has a second voice volume value smaller than the first voice volume value, determine the conversation area as a second area including the position and being smaller than the first area,
the conversation area being a spatial range where an utterance of the person can be heard;
an information provision unit configured to provide provision information to the conversation area; and
an ambient sound measurement unit configured to measure an ambient sound in the conversation space,
wherein the conversation area determination unit is configured to:
when the ambient sound has a first sound volume, determine the conversation area as a third area; and
when the ambient sound has a second sound volume larger than the first sound volume, determine the conversation area as a fourth area smaller than the third area.

5. A method of controlling a voice agent device, the method comprising:
detecting a position of a person in a conversation space which is a space to which the voice agent device is capable of providing information;
detecting a voice volume of the person from a sound signal in the conversation space obtained by a sound acquisition unit;
determining, when the voice volume has a first voice volume value, a conversation area as a first area including the position, and determining, when the voice volume has a second voice volume value smaller than the first voice volume value, the conversation area as a second area including the position and being smaller than the first area, the conversation area being a spatial range where an utterance of the person can be heard;
providing provision information to the conversation area; and
identifying a person in the conversation area;
wherein in said providing, when people are in the conversation area, the provision information to be provided to the people is selected based on (i) stored preset profile information showing pieces of information on individuals and (ii) identification results obtained in said identifying.

6. A non-transitory computer-readable recording medium having a program stored thereon for causing a computer to execute the method of controlling the voice agent device according to claim 5.

7. An integrated circuit for use in a voice agent device, the integrated circuit comprising:
- a position detection unit configured to detect a position of a person in a conversation space which is a space to which the voice agent device is capable of providing information;
- a voice volume detection unit configured to detect a voice volume of the person from a sound signal in the conversation space obtained by a sound acquisition unit;
- a conversation area determination unit configured to:
  when the voice volume has a first voice volume value, determine a conversation area as a first area including the position; and
  when the voice volume has a second voice volume value smaller than the first voice volume value, determine the conversation area as a second area including the position and being smaller than the first area,
  the conversation area being a spatial range where an utterance of the person can be heard;
- an information provision unit configured to provide provision information to the conversation area; and
- an individual identification unit configured to identify a person in the conversation area,
- wherein the information provision unit includes:
- a memory unit configured to store preset profile information showing pieces of information on individuals; and
- an information selection unit configured to, when people are in the conversation area, select the provision information to be provided to the people, based on the profile information and identification results obtained by the individual identification unit.

8. A method of controlling a voice agent device, the method comprising:
- detecting a position of a person in a conversation space which is a space to which the voice agent device is capable of providing information;
- detecting a voice volume of the person from a sound signal in the conversation space obtained by a sound acquisition unit;
- determining, when the voice volume has a first voice volume value, a conversation area as a first area including the position, and determining, when the voice volume has a second voice volume value smaller than the first voice volume value, the conversation area as a second area including the position and being smaller than the first area, the conversation area being a spatial range where an utterance of the person can be heard;
- providing provision information to the conversation area; and
- measuring an ambient sound in the conversation space,
- wherein, in said determining, when the ambient sound has a first sound volume, the conversation area is determined as a third area, and when the ambient sound has a second sound volume larger than the first sound volume, the conversation area is determined as a fourth area smaller than the third area.

9. A non-transitory computer-readable recording medium having a program stored thereon for causing a computer to execute the method of controlling the voice agent device according to claim 8.

10. An integrated circuit for use in a voice agent device, the integrated circuit comprising:
- a position detection unit configured to detect a position of a person in a conversation space which is a space to which the voice agent device is capable of providing information;
- a voice volume detection unit configured to detect a voice volume of the person from a sound signal in the conversation space obtained by a sound acquisition unit;
- a conversation area determination unit configured to:
  when the voice volume has a first voice volume value, determine a conversation area as a first area including the position; and
  when the voice volume has a second voice volume value smaller than the first voice volume value, determine the conversation area as a second area including the position and being smaller than the first area,
  the conversation area being a spatial range where an utterance of the person can be heard;
- an information provision unit configured to provide provision information to the conversation area; and
- an ambient sound measurement unit configured to measure an ambient sound in the conversation space,
- wherein the conversation area determination unit is configured to:
- when the ambient sound has a first sound volume, determine the conversation area as a third area; and
- when the ambient sound has a second sound volume larger than the first sound volume, determine the conversation area as a fourth area smaller than the third area.

* * * * *